US009532270B2

(12) United States Patent
Cui et al.

(10) Patent No.: US 9,532,270 B2
(45) Date of Patent: Dec. 27, 2016

(54) WIRELESS COMMUNICATION NETWORK SYSTEM BASED ON CENTRALIZED CONTROL AND CONTENT DELIVERY

(71) Applicant: Beijing University of Posts and Telecommunications, Beijing (CN)

(72) Inventors: Qimei Cui, Beijing (CN); Xiaofeng Tao, Beijing (CN); Yulong Shi, Beijing (CN); Hui Wang, Beijing (CN); Yu Gu, Beijing (CN); Tianpeng Yuan, Beijing (CN)

(73) Assignee: Beijing University of Posts and Telecommunications (CN)

( * ) Notice: Subject to any disclaimer, the term of this patent is extended or adjusted under 35 U.S.C. 154(b) by 111 days.

(21) Appl. No.: 14/663,546

(22) Filed: Mar. 20, 2015

(65) Prior Publication Data

US 2015/0334773 A1    Nov. 19, 2015

(30) Foreign Application Priority Data

May 15, 2014   (CN) .......................... 2014 1 0206200

(51) Int. Cl.
*H04L 29/08* (2006.01)
*H04W 28/16* (2009.01)
*H04W 88/08* (2009.01)

(52) U.S. Cl.
CPC ............ *H04W 28/16* (2013.01); *H04W 88/08* (2013.01); *H04L 67/288* (2013.01); *H04L 67/2842* (2013.01)

(58) Field of Classification Search
CPC ... H04L 67/2842; H04L 67/288; H04W 28/16; H04W 88/08; H04W 84/06; H04B 7/18528; H04B 7/18571; H04B 7/18576

USPC ........................................................ 370/328
See application file for complete search history.

(56) References Cited

U.S. PATENT DOCUMENTS

| 2008/0268907 | A1* | 10/2008 | Senarath | H04L 1/16 455/561 |
| 2011/0090838 | A1* | 4/2011 | Shaw | H04L 1/0026 370/313 |
| 2011/0158340 | A1* | 6/2011 | Swanson | H04B 7/022 375/267 |
| 2012/0082131 | A1* | 4/2012 | Agrawal | H04W 36/08 370/331 |
| 2014/0235231 | A1* | 8/2014 | Moore | H04W 28/06 455/422.1 |

(Continued)

*Primary Examiner* — Chi H Pham
*Assistant Examiner* — Robert Lopata
(74) *Attorney, Agent, or Firm* — Lerner, David, Littenberg, Krumholz & Mentlik, LLP

(57) ABSTRACT

The present disclosure provides a wireless communication network system based on centralized control and content delivery, comprising a centralized controller, a core network data forwarding unit, a core network data cache unit, and at least one distributed base station. The centralized control and content delivery control can be performed by the wireless communication network system provided by the present disclosure. In this manner, the user experience can be guaranteed, the centralized control can be realized, and the load of the base station equipment can be reduced to the largest extent. At the same time, the data interaction between base station and internet can be reduced, and thus the occupancy of bandwidth resources can be reduced accordingly.

9 Claims, 2 Drawing Sheets

(56) References Cited

U.S. PATENT DOCUMENTS

| | | | |
|---|---|---|---|
| 2015/0215918 A1* | 7/2015 | Wu | H04W 72/0433 370/329 |
| 2015/0282070 A1* | 10/2015 | Salem | H04W 52/0206 370/311 |
| 2015/0381756 A1* | 12/2015 | Lotfallah | H04L 67/2814 709/213 |
| 2015/0382320 A1* | 12/2015 | Rune | H04W 4/20 455/426.1 |

* cited by examiner

ThisUS 9,532,270 B2

WIRELESS COMMUNICATION NETWORK SYSTEM BASED ON CENTRALIZED CONTROL AND CONTENT DELIVERY

CROSS-REFERENCE TO RELATED APPLICATIONS

The present application claims priority from Chinese Application No. 201410206200.2, filed May 15, 2014, the disclosure of which is hereby incorporated herein by reference.

FIELD OF THE INVENTION

The present disclosure relates to the telecommunication field, and particularly to a wireless communication network system based on centralized control and content delivery.

BACKGROUND OF THE INVENTION

With the rapid development of wireless communication technology, the network becomes increasingly more intensified and diversified. How to realize the integration of heterogeneous network has become a focus for researching. Open Radio presents a virtual wireless network architecture with the operations of control and forwarding being separated from each other, which is characterized in that the control plane is centralized and the forwarding plane is generalized. However, due to the differences among 3G, 4G, and Wireless Local Area Networks (WLAN) technologies, it is difficult to separate control functions of some lower level therefrom, such as Hybrid Automatic Repeat Request (HARQ), physical resource block scheduling, code modulation, synchronization, power control, physical layer measuring function, channel estimation, link adaptation and so on. Even if control functions of the lower level can be separated therefrom and then centralized, the complexity of the centralized functions will render the design of control plane and forwarding plane rather difficult. In the mean time, with the rapid development of mobile Internet, especially the development of Video Services, the operators begin to pay attention to Content Delivery Network (CDN). However, in the present time there is no suitable network architecture for carrying CDN services yet.

SUMMARY OF THE INVENTION

The purpose of the present disclosure is to provide a wireless communication network system based on centralized control and content delivery.

To achieve the above purpose, the present disclosure provides a wireless communication network system based on centralized control and content delivery, comprising: a centralized controller, a core network data forwarding unit, a core network data cache unit, and at least one distributed base station, wherein said distributed base station comprises a base station control unit and a base station data forwarding unit, in which said base station control unit is configured for Hybrid Automatic Repeat Request, physical resource block scheduling, code modulation, synchronization, power control, physical layer measuring function, channel estimation, link adaptation, and enabling said base station data forwarding unit to forward data between an internet and said core network data forwarding unit;

said core network data cache unit is connected with said core network data forwarding unit for storing an access frequency of each distributed base station and/or the content which are requested by the users over a preset times;

said centralized controller comprises an access network control unit, which is configured for realizing joint access control, joint resource scheduling, personalized Quality of Service customization, dynamic traffic offloading, and joint interference suppression of each base station control unit; and said centralized controller further comprises a content delivery control unit, which is configured for determining whether a requested content of current user request is cached in said core network data cache unit or not, and if yes, enabling said core network data forwarding unit to send corresponding data stored in said core network data cache unit to a corresponding user.

Preferably, said access network control unit is also configured for realizing upper level functions of a single base station.

Preferably, said upper level functions of a single base station specifically comprise authentication, channel mapping, packet scheduling, broadcasting, paging, Radio Resource Control connection management, and Quality of Service management.

Preferably, said centralized controller further comprises a content cache management unit, which is connected with said core network data forwarding unit for enabling said core network data forwarding unit to manage and update a content stored in said core network data cache unit.

Preferably, said content delivery control unit is also configured for positioning a content requested by a user.

Preferably, said content delivery control unit is also used for:

searching a coordinated cell of a user, so as to schedule resources to said user according to proximity principle; and/or scheduling resources to users in a unified manner according to current load condition and/or a matching degree of cache of a coordinated base station.

Preferably, said distributed base station further comprises a base station data cache unit, which is used for storing the access frequencies of all users covered by said distributed base station and the content that the users request over the preset times; and said base station data forwarding unit is configured for determining whether a requested content in the current user request is stored in said base station data cache unit or not, and if yes, sending corresponding data stored in said base station data cache unit to a corresponding user.

Preferably, said access network control unit is further configured for, after receiving down-link data sent from an internet, converting said down-link data into those data in a protocol type corresponding to a distributed destination base station.

Preferably, said centralized controller further comprises a core network controller for mobility management, billing, and authentication.

According to the wireless communication network system provided by the present disclosure, the procedures with a strict delay requirement, such as HARQ, physical resource block scheduling, code modulation, synchronization, power control, physical layer measuring function, channel estimation, link adaptation, etc, are performed in the distributed base station, while the procedures which need joint scheduling or joint access control, joint resource scheduling, personalized Quality of Service (QoS) customization, dynamic traffic offload, and joint interference suppression and the like with a less strict delay requirement, are performed in the centralized controller. In this manner, on the premise of guaranteeing the user experience, the centralized control can be mostly realized, and the load of the base station equipment can be reduced. In addition, through storing the access frequency of each base station and the content the user requests most frequently in the core network, and when determining that the content of current user requests is stored in the cache unit, sending corresponding stored content to the user, the data interaction between the base station and the core network can be reduced, and thus the occupancy of bandwidth resources can be reduced accordingly.

DETAILED DESCRIPTION OF THE EMBODIMENTS

The embodiments of the present disclosure are illustrated hereinafter in combination with the drawings and examples, which is only used for interpreting the technical solution of the present disclosure more clearly, not for limiting the protection scope of the present disclosure.

Figure 1:
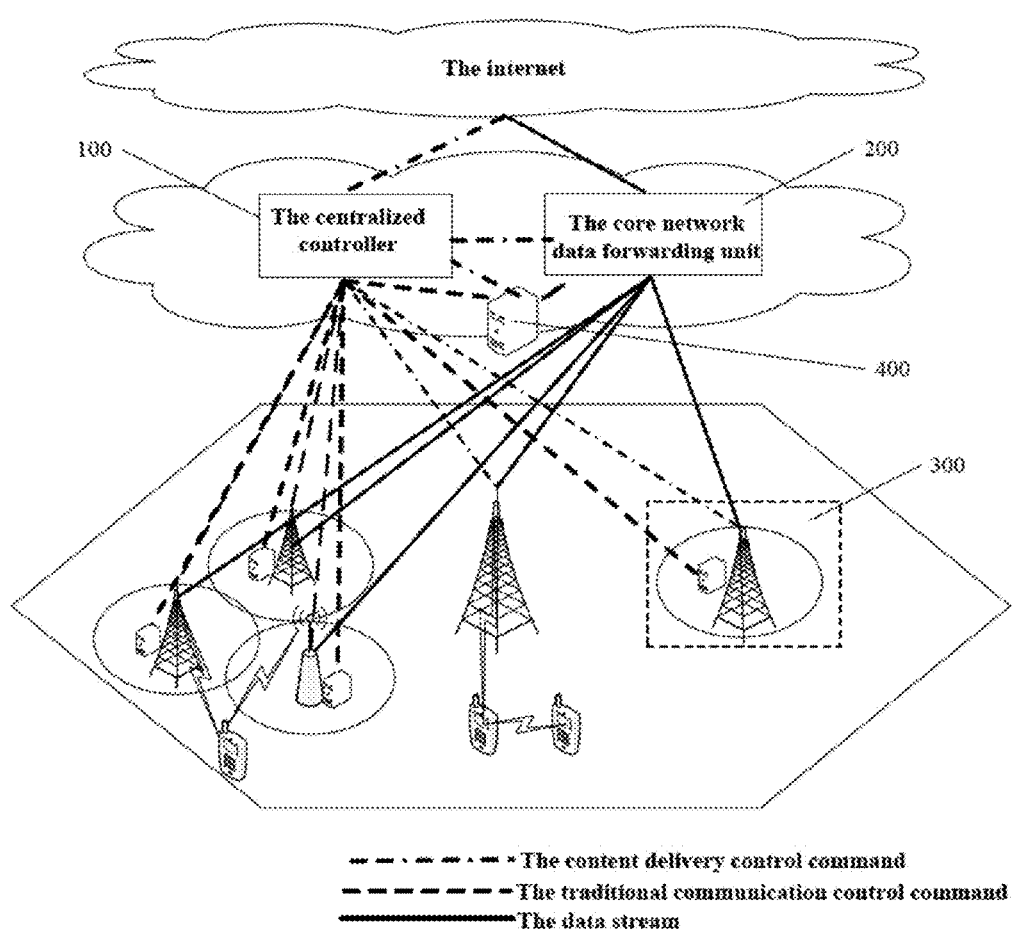
FIG. 1 is a structural diagram of a wireless communication network system provided by the present disclosure.
Figure 2:
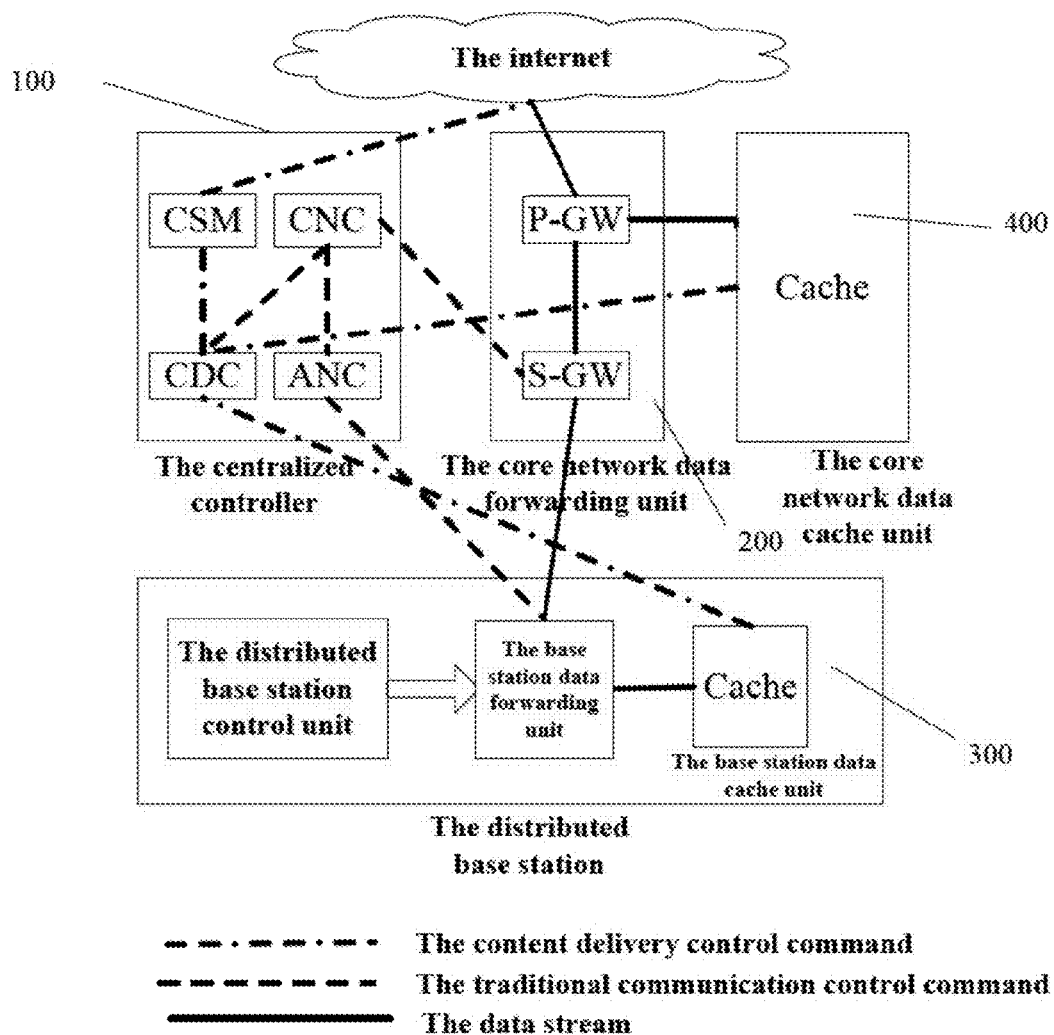
FIG. 2 is a structural diagram of a wireless communication network system provided by the present disclosure.

The present disclosure provides a wireless communication network system based on centralized control and content delivery, as shown in FIG. 1 or FIG. 2, and the system comprises a centralized controller 100, a core network data forwarding unit 200, and at least one distributed base station 300.

As shown in FIG. 2, each distributed base station 300 comprises a base station control unit and a base station data forwarding unit which are connected for Hybrid Automatic Repeat Request, physical resource block scheduling, code modulation, synchronization, power control, physical layer measuring function, channel estimation, link adaptation, and enabling said base station data forwarding unit to forward data between an internet and said core network data forwarding unit 200.

The centralized controller 100 comprises an Access Network Control (ANC) unit, which is configured for realizing joint access control, joint resource scheduling, personalized QoS customization, dynamic traffic offloading, and joint interference suppression with respect to each base station control unit.

According to the wireless communication network system provided by the present disclosure, the procedures with a strict delay requirement, such as HARQ, physical resource block scheduling, code modulation, synchronization, power control, physical layer measuring function, channel estimation, link adaptation, etc, are performed in the distributed base station, while the procedures which need joint dispatch or which put a low requirement on time delay, such as joint access controlling, joint resource scheduling, personalized QoS customization, dynamic traffic offloading, and joint interference suppression and the like with a less strict delay requirement, are performed in the centralized controller. In this manner, on the premise of guaranteeing the user experience, the centralized control is mostly realized, and the load of the base station equipment is reduced.

As shown in FIG. 1 or FIG. 2, the wireless communication network system provided by the present disclosure further comprises a core network data cache unit 400, which is configured for storing access frequency of each distributed base station 300 and/or the requested content that user have requested over a preset times.

The centralized controller 100 further comprises a Content Delivery Control (CDC) unit, which is configured for determining whether a requested content in the current user request is stored in said core network data cache unit 400 or not, and if yes, enabling said core network data forwarding unit 200 to send corresponding data cached in said core network data cache unit 400 to a corresponding user.

In this manner, the data interaction between the core network data forwarding unit and the internet can be reduced, and thus the occupancy of bandwidth resources can be reduced accordingly.

Preferably, said access network control unit is also configured for realizing the upper level functions of a single base station.

Further, the upper level functions of a single base station specifically comprise authentication, channel mapping, packet scheduling, broadcast, paging, Radio Resource Control (RRC) connection management, and QoS management.

Preferably, the centralized controller 100 further comprises a Content Source Management (CSM) unit, which is connected with said core network data forwarding unit 200, for enabling said core network data forwarding unit 200 to manage and update a content stored in said core network data cache unit 400.

Preferably, the content delivery control unit is also configured for positioning a content requested by a user.

Preferably, the content delivery control unit is further configured for searching coordinated cells for a user, so as to schedule resource to said user according to proximity principle; and/or scheduling resources to users in a unified manner according to current load condition and/or a matching degree for caches of a coordinate base station.

In this manner, the resources can be scheduled uniformly.

Preferably, in the wireless communication network system, the distributed base station 300 further comprises a base station data cache unit, which is configured for storing an access frequency of each distributed base station and the content that the user requests over the preset times; and said base station data forwarding unit is configured for determining whether a requested content of current user request is cached in said base station data cache unit or not, and if yes, sending a corresponding data cached in said base station data cache unit to a corresponding user.

In this manner, the data interaction between the core network data forwarding unit and the internet can be reduced, and thus the occupancy of bandwidth resources can be reduced accordingly.

Preferably, the access network control unit is further configured for, after receiving down-link data sent from an internet, converting said down-link data into a protocol type corresponding to a distributed destination base station.

In this way, the joint control of heterogeneous network can be realized.

Preferably, the centralized controller 100 further comprises a Core Network Controller (CNC), which is configured for mobility management, billing, and authentication.

The functions of each of the parts of the preferred embodiments of the wireless communication network system provided by the present disclosure and the implementing methods thereof will be explained hereinafter.

1.1 The centralized control unit 1.1.1 The access network control unit

The control functions relate to the cooperation among base stations of the original wireless access network and the upper level control functions which can be performed by a single base station are transferred to the access network control unit, wherein the control functions relating to the cooperation among base stations of the original wireless access network comprise joint access control, joint resource scheduling, personalized QoS customization, dynamic traffic offloading, and joint interference suppression of each base station control unit, and the upper level functions of a single base station comprise authentication, channel mapping, packet scheduling, broadcasting, paging, RRC connection management, and QoS management.

Only a few of typical control functions of the access network control unit will be illustrated as follows, so as to explain the present disclosure.

Joint Access Controlling

The joint access controlling function is used for determining whether an access is permitted or not when a user requests for establishing new radio bearer under the coverage of both multiple base stations and heterogeneous systems, so as to enable the user equipment access to one base station or a plurality of base stations for wireless transmission, for ensuring the QoS of the user. The purpose thereof is that the user who initiates the service request can utilize the wireless resources of the network effectively and optimally, and in the meantime the QoS requirement of the current session can be guaranteed.

In the wireless access control strategy, the user status and network status should be taken into consideration simultaneously. Furthermore, the following factors should also be taken into consideration when making decisions, i) user side: the priority of the user and the QoS requirement of the new session; and ii) network side: the load and throughput of the network, the link quality, the resource using condition of each base station, the QoS requirement of the current conversation, etc. The decision of the access network control unit is notified to the base station of the Radio Access Network (RAN) through signaling, the user is permitted to access to a certain base station, and the corresponding session can be established.

Joint Resource Scheduling

The wireless resources of different base stations with a plurality of formats can be virtually mapped uniformly through the joint resource dispatching function of the access network control unit. The logical virtual resources can be dispatched jointly by the access network control unit according to different QoS requirement, subscription service, and the priorities of the users, as well as quality and interference situation of the current channel, so that the user-centered network layer services can be customized. Especially, with respect to joint resources dispatching among heterogeneous base stations, there are a certain proportion of different system resources in the virtualized wireless resources, such as WLAN and Long Term Evolution (LTE), and thus different proportion of virtual resources are allocated to different users respectively according to different requirements of the corresponding users for services. In this manner, the resources of a plurality of heterogeneous systems can be used by users uniformly.

Dynamic Traffic Offloading

If the loads of different base stations of the network change, the load balancing among different base stations should be performed by the access network control unit. Especially, for two-way connected users, the data stream needs to be dynamically allocated among different base stations, wherein the access network control unit monitors the condition of the network, makes decisions, and then notifies the corresponding base station to carry the specified amount of data stream.

Joint Interference Suppression

There is some interference among adjacent cells. Especially when the same frequency resource is used, the user will be interfered by the signal of neighbor cell. However, through overall deploying the frequency resources, the access network control unit can make the adjacent cells avoid using the same frequency resource as much as possible. When the main cell allocates the frequency resources to a certain user, the access network control unit will notify the adjacent cells that users who use the same frequency resource after that should be far away from the certain user as possible. In particular, with respect to the enhanced Inter Cell Interference Coordination (eICIC) technology in the cellular system, if the unified planning is performed by the access network control unit, the efficiency of the interference suppression can be improved mostly.

QoS Management

The QoS of all network users can be guaranteed through unified management of the access network control unit. If the QoS of services of a certain user cannot satisfy the demand of the user, the access network control unit will attempt to guarantee the QoS through resource dispatching in the base station; if the QoS cannot still be satisfied, the access network control unit will call neighbor cells to provide services for the user cooperatively, so as to allocate the wireless resources of the neighbor cells to the user; if the QoS cannot be satisfied still yet, the access network control unit will schedule the frequency band resource of other systems (for example, the LTE user borrows the wireless resources of the WLAN system) to provide service for the user, so that the QoS requirement can be guaranteed.

1.1.2 The Core Network Control Unit

The original control functions of Evolved Packet Core (EPC), such as Mobility Management Entity (MME), billing, and authentication, are transferred to the core network control unit. A few of typical control functions of the core network control unit will be stated hereinafter.

Mobility Management Entity

The functions of the Mobility Management Entity mainly comprise bearer connection and bearer release of the terminal, the transfer from idle state to active state, and the management of security key. When the user moves in different cells, the core network control unit manages the location updating of the user in real-time, and performs mobility management on the user in the whole network. When the user switches among different cells, the core network control unit performs seamless switching between homogeneous base station and heterogeneous base station. The core network control unit has the information of all base stations of the network, and can choose the best purpose base station in all adjacent cells of the user (including homogeneous cells and heterogeneous cells), so that the connection between the base station and the user device can be established or released.

Authentication

The core network control unit is not only responsible for the authentication of the users who access to the system of each base station, but more importantly, responsible for mutual authentication of heterogeneous networks. For example, in the network with LTE and WLAN coexisting with each other, when a LTE user wants to access to WLAN network, in order to improve the security of the user in the WLAN network, the core network control unit will help WLAN to perform authentication of the user by means of the authentication gateway of LET, so that the security of the WLAN system can be improved. Likewise, when a WLAN user wants to access to LET network, the core network control unit can help the LET network to reduce the time delay of the authentication thereof by virtue of the authentication information of the WLAN system.

Billing

The core network control unit is not only responsible for the billing of traditional data stream, but also responsible for the billing of content distribution stream of all levels.

1.1.3 The Content Cache Management Unit

The functions of the content delivery control module are transferred to the core network controller. A few of typical control functions of the content cache management unit will be stated hereinafter.

Content Managing

Due to the cache of all levels, the contents with high access frequency and cache hit rate are counted and injected into the cache of RAN and the cache of core network according to content injection algorithm.

Content Updating

The data in the content cache are updated regularly according to updating algorithm, so that the latest contents can be saved.

1.1.4 The content delivery control unit

Content Resource Positioning

The base stations which have the cache contents are searched through the register.

Load Balancing

The cooperative cells of users are searched, and the resources are dispatched to users uniformly mainly according to proximity principle (propagation loss), current load condition and matching degree of cache of cooperative base station.

1.2 The Distributed Base Station Control Unit

The control functions of base stations with a high requirement on delay which do not need joint optimization are still retained in the RAN, mainly comprising HARQ, physical resource block scheduling, code modulation, synchronization, power control, physical layer measuring function, channel estimation, link adaptation, and caching and forwarding control of users.

Specifically, in the preferred embodiments of the wireless communication network system provided by the present disclosure, the content delivery procedures comprise the following steps.

In step 1, the user 1 requests for establishing connection. First, the requesting information is sent to MME via the access network control unit so as to request MME for establishing connection. The Multimedia Messaging Service (MMS) interrogates the Home Subscriber Server (HSS) and authenticates the user.

In step 2, the service base station searches the cache of other users near to user 1. If the same cache is detected, the service base station sends control command to the users who have the same cache, and then Device-to-Device (D2D) communication among users is performed. If all contents requested by the user are delivered, the content delivery procedure comes to an end; or else, proceeds to step 3.

In step 3, the base station sends the information request which requests for the remaining content to the content delivery control unit, and the content delivery control unit examines in the registration form to determine whether there is the same content in the cache of the base station. If there is the content requested by the user in the cache of the base station, the cache of the base station is delivered to the user according to load balancing algorithm, the distance between the cache of the base station and the user and other information. If all contents requested by the user are delivered, the content delivery procedure ends; or else proceeds to step 4.

In step 4, the content delivery control unit searches in the registration form to determine whether there is any remaining same content in the cache of the P-GW gateway or not. If yes, the remaining content is delivered continuously. If all contents requested by the user are delivered, the content delivery procedure ends; or else proceeds to step 5.

In step 5, the content delivery control unit requests the remaining content for the internet, and the server, after receiving the request, sends the data in groups to the P-GW gateway.

Specifically, in the wireless communication network system provided by the present disclosure, the heterogeneous joint control procedures comprise the following steps.

In step 1, the user 2 requests for establishing connection. First, the requesting information is sent to the core network controller via the access network control unit so as to request the core network controller for establishing connection. The core network controller interrogates the HSS and authenticates the user.

In step 2, the access network control unit performs joint access controlling, wherein whether the user equipment can access to one base station or a plurality of base stations for wireless transmission is determined. Both the user status and network status should be taken into consideration in the wireless access control strategy. The decision is made according to the priority of the user, the QoS requirement of the new session, the network load of the base station, the throughput, the link quality, the resource using situation, the QoS requirement of the current session, etc.

In step 3, the decision of the access network control unit is notified to the base station through signaling, so as to permit the user to access to a certain base station, and thus establish a connection for the corresponding session.

In step 4, the access network control unit performs joint resource scheduling, wherein the wireless resources of different base stations with a plurality of formats can be virtually mapped uniformly. The logical virtual resources can be dispatched jointly by the access network control unit according to different QoS requirement, subscription service, and the priorities of the users, as well as current channel quality and interference situation, so as to customize the user-centered network layer services. Especially, with respect to joint resources dispatching among heterogeneous base stations, there are a certain proportion of different system resources, such as WLAN and LTE, in the virtualized wireless resources, and thus different proportion of virtual resources are allocated to different users respectively according to different needs of the corresponding users on services. In this manner, the resources of a plurality of heterogeneous systems can be uniformly allocated to users. There are a certain degree of interferences between adjacent cells. Especially when the same frequency resource is used, the user will be interfered by the signal of its neighbor cell. The situation that the adjacent cells use the same frequency resource can be avoided to the largest extent through the overall deployment on the frequency resources by the access network control unit. When the frequency resource are allocated to a certain user by the main cell, the access network control unit will notify the adjacent cells that the user who uses the same frequency resource once again should be as far as possible. In particular, as to the enhanced eICIC technology in the cellular system, if the unified deployment is performed by the access network control unit, the efficiency of the interference suppression can be improved greatly.

The preferred embodiments of the present disclosure are stated hereinabove. It should be noted that, any improvements and amendments made by a person skilled in the art without departing from the technological principle of the present disclosure shall fall within the protection scope of the present disclosure.

The invention claimed is:

1. A wireless communication network system based on centralized control and content delivery, comprising:
a centralized controller, a core network data forwarding unit, a core network data cache unit, and at least one distributed base station,
wherein said distributed base station comprises a base station control unit and a base station data forwarding unit, in which said base station control unit is configured for Hybrid Automatic Repeat Request, physical resource block scheduling, code modulation, synchronization, power control, physical layer measuring function, channel estimation, link adaptation, and enabling said base station data forwarding unit to forward data between an internet and said core network data forwarding unit;
said core network data cache unit is connected with said core network data forwarding unit for storing an access frequency of each distributed base station and/or the content which are requested by the users over a preset times;
said centralized controller comprises an access network control unit, which is configured for realizing joint access control, joint resource scheduling, personalized Quality of Service customization, dynamic traffic offloading, and joint interference suppression of each base station control unit; and
said centralized controller further comprises a content delivery control unit, which is configured for determining whether a requested content of current user request is cached in said core network data cache unit or not, and if yes, enabling said core network data forwarding unit to send corresponding data stored in said core network data cache unit to a corresponding user.

2. The wireless communication network system according to claim 1, wherein said access network control unit is also configured for realizing upper level functions of a single base station.

3. The wireless communication network system according to claim 2, wherein said upper level functions of a single base station specifically comprise authentication, channel mapping, packet scheduling, broadcasting, paging, Radio Resource Control connection management, and Quality of Service management.

4. The wireless communication network system according to claim 1, wherein said centralized controller further comprises a content cache management unit, which is connected with said core network data forwarding unit for enabling said core network data forwarding unit to manage and update a content stored in said core network data cache unit.

5. The wireless communication network system according to claim 1, wherein said content delivery control unit is also configured for positioning a content requested by a user.

6. The wireless communication network system according to claim 1, wherein said content delivery control unit is also used for:
searching a coordinated cell of a user, so as to schedule resources to said user according to proximity principle; and/or
scheduling resources to users in a unified manner according to current load condition and/or a matching degree of cache of a coordinated base station.

7. The wireless communication network system according to claim 1, wherein said distributed base station further comprises a base station data cache unit, which is used for storing the access frequencies of all users covered by said distributed base station and the content that the users request over the preset times; and
said base station data forwarding unit is configured for determining whether a requested content in the current user request is stored in said base station data cache unit or not, and if yes, sending corresponding data stored in said base station data cache unit to a corresponding user.

8. The wireless communication network system according to claim 1, wherein said access network control unit is further configured for, after receiving down-link data sent from an internet, converting said down-link data into those data in a protocol type corresponding to a distributed destination base station.

9. The wireless communication network system according to claim 1, wherein said centralized controller further comprises a core network controller for mobility management, billing, and authentication.

* * * * *